(12) United States Patent
Vasisht et al.

(10) Patent No.: US 10,210,240 B2
(45) Date of Patent: Feb. 19, 2019

(54) SYSTEMS AND METHODS FOR CODE PARSING AND LINEAGE DETECTION

(71) Applicant: Capital One Services, LLC, McLean, VA (US)

(72) Inventors: Sunil Vasisht, Plano, TX (US); Fei Tong, Plano, TX (US); Yuanyuan Yin, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/694,128

(22) Filed: Sep. 1, 2017

(65) Prior Publication Data

US 2019/0005117 A1    Jan. 3, 2019

Related U.S. Application Data

(60) Provisional application No. 62/527,816, filed on Jun. 30, 2017.

(51) Int. Cl.
*G06F 17/30* (2006.01)
*G06F 9/44* (2018.01)
(Continued)

(52) U.S. Cl.
CPC .......... *G06F 17/30604* (2013.01); *G06F 8/35* (2013.01); *G06F 8/70* (2013.01);
(Continued)

(58) Field of Classification Search
CPC ......... G06F 17/30297; G06F 17/30309; G06F 17/30731; G06F 17/30572; G06F 17/3053; G06F 17/30463; G06F 17/30569; G06F 8/35; G06F 8/34; G06F 8/76; G06F 8/51; G06F 21/604; G06F 17/30404;
(Continued)

(56) References Cited

U.S. PATENT DOCUMENTS 4,829,427 A * 5/1989 Green ............... G06F 17/30433
5,432,930 A * 7/1995 Song ................. G06F 17/30404
(Continued)

OTHER PUBLICATIONS

Miryung Kim et al., An Empirical Study of Code Clone Genealogies, 2005, [Retrieved on Oct. 11, 2018]. Retrieved from the internet: <URL: http://groups.csail.mit.edu/pag/OLD/reading-group/kim05clone.pdf> 10 pp. 187-196 (Year: 2005).*
(Continued)

*Primary Examiner* — Anibal Rivera
(74) *Attorney, Agent, or Firm* — Finnegan, Henderson, Farabow, Garrett & Dunner, LLP

(57) ABSTRACT

Disclosed embodiments provide systems, methods, and techniques for lineage detection of calculations (e.g., processes, metrics, important data elements, data elements, or the like). According to disclosed embodiments, a lineage detector acquires one or more parameters, which at least include a first parameter indicative of source code and a second parameter indicative of a calculation. The lineage detector also parses the source code. After parsing the source code, the lineage detector determines the data lineage of the calculation based on the parsed source code. In some embodiments, the lineage detector generates and displays output of the data lineage.

20 Claims, 6 Drawing Sheets

(51) Int. Cl.
*G06F 17/00* (2006.01)
*G06F 9/46* (2006.01)
*G06F 8/35* (2018.01)
*G06F 8/70* (2018.01)

(52) U.S. Cl.
CPC .. *G06F 17/30297* (2013.01); *G06F 17/30424* (2013.01); *G06F 17/30427* (2013.01); *G06F 17/30463* (2013.01); *G06F 17/30554* (2013.01)

(58) Field of Classification Search
CPC ............... G06F 17/30427; G06F 9/547; G06F 17/30424; G06F 17/30412; G06F 17/30592; G06F 17/30448; G06F 17/30421; G06F 17/30554; G06F 17/30911; G06F 17/30648; G06F 17/30395
See application file for complete search history.

(56) References Cited

U.S. PATENT DOCUMENTS

| | | | | |
|---|---|---|---|---|
| 6,421,663 | B1* | 7/2002 | Chen | G06F 17/30436 |
| 6,658,660 | B1* | 12/2003 | Minyard | G06F 9/547 |
| | | | | 717/106 |
| 6,826,562 | B1* | 11/2004 | Leung | G06F 17/30451 |
| | | | | 707/713 |
| 7,117,219 | B1* | 10/2006 | Powers | G06F 17/30572 |
| | | | | 707/603 |
| 7,213,017 | B2* | 5/2007 | Rys | G06F 17/30569 |
| 7,603,349 | B1* | 10/2009 | Kraft | G06F 17/30867 |
| 7,725,433 | B1* | 5/2010 | Labrie | G06F 17/30297 |
| | | | | 707/612 |
| 8,051,408 | B1* | 11/2011 | Johnson | G06F 8/33 |
| | | | | 715/705 |
| 9,659,042 | B2* | 5/2017 | Puri | G06F 17/30309 |
| 9,881,055 | B1* | 1/2018 | Kapoor | G06F 17/30427 |
| 2003/0172075 | A1* | 9/2003 | Reisman | G06F 17/30648 |
| 2003/0218639 | A1* | 11/2003 | Lee | G06F 3/0481 |
| | | | | 715/853 |
| 2003/0233618 | A1* | 12/2003 | Wan | G06F 17/30911 |
| | | | | 715/241 |
| 2004/0034616 | A1* | 2/2004 | Witkowski | G06F 17/30592 |
| 2004/0036716 | A1* | 2/2004 | Jordahl | G06F 17/30601 |
| | | | | 715/713 |
| 2004/0167873 | A1* | 8/2004 | Dettinger | G06F 17/30395 |
| 2004/0199524 | A1* | 10/2004 | Rys | G06F 17/30569 |
| 2005/0071359 | A1* | 3/2005 | Elandassery | G06F 17/30297 |
| 2005/0229154 | A1* | 10/2005 | Hiew | G06F 8/34 |
| | | | | 717/110 |
| 2005/0262048 | A1* | 11/2005 | Dettinger | G06F 17/30427 |
| 2006/0053106 | A1* | 3/2006 | Bhaghavan | G06Q 10/06 |
| 2006/0136875 | A1* | 6/2006 | Thorpe | G06F 21/16 |
| | | | | 717/122 |
| 2008/0281786 | A1* | 11/2008 | Duffy | G06F 17/30445 |
| 2009/0210438 | A1* | 8/2009 | Cox | G06F 17/30412 |
| 2010/0083238 | A1* | 4/2010 | Barnett | G06F 8/70 |
| | | | | 717/136 |
| 2011/0022583 | A1* | 1/2011 | Pennell, Sr. | G06F 17/30463 |
| | | | | 707/718 |
| 2011/0137922 | A1* | 6/2011 | Cushing | G06F 17/30463 |
| | | | | 707/755 |
| 2011/0302220 | A1* | 12/2011 | Marcella | G06F 17/30448 |
| | | | | 707/803 |
| 2012/0023586 | A1* | 1/2012 | Flickner | G06F 17/30424 |
| | | | | 726/25 |
| 2012/0323863 | A1* | 12/2012 | Dove | G06F 17/30731 |
| | | | | 707/692 |
| 2012/0323889 | A1* | 12/2012 | Marum | G06F 17/30554 |
| | | | | 707/722 |
| 2013/0117288 | A1* | 5/2013 | De Smet | G06F 17/30421 |
| | | | | 707/756 |
| 2013/0332423 | A1* | 12/2013 | Puri | G06F 17/30309 |
| | | | | 707/687 |
| 2013/0346426 | A1* | 12/2013 | O'Byrne | G06F 17/30309 |
| | | | | 707/754 |
| 2014/0095471 | A1* | 4/2014 | Deshmukh | G06F 17/30463 |
| | | | | 707/714 |
| 2015/0012478 | A1* | 1/2015 | Mohammad | G06Q 10/063 |
| | | | | 707/602 |
| 2015/0160934 | A1* | 6/2015 | Beit-Aharon | G06F 8/76 |
| | | | | 717/137 |
| 2016/0062870 | A1* | 3/2016 | Menahem | G06F 11/362 |
| | | | | 717/125 |
| 2017/0091680 | A1* | 3/2017 | Rosenthal | G06Q 10/0635 |
| 2017/0140160 | A1* | 5/2017 | Arasan | G06F 21/604 |
| 2017/0154087 | A1* | 6/2017 | McClure | G06F 17/30572 |
| 2017/0177309 | A1* | 6/2017 | Bar-Or | G06F 8/34 |
| 2017/0185604 | A1* | 6/2017 | Broll | G06F 17/30073 |
| 2017/0199875 | A1* | 7/2017 | Nevrekar | G06F 17/3053 |
| 2018/0096031 | A1* | 4/2018 | Stanley | G06F 17/30516 |

OTHER PUBLICATIONS

Michi Mutsuzaki et al., Trio-One: Layering Uncertainty and Lineage on a Conventional DBMS, Jan. 7-10, 2007, [Retrieved on Oct. 11, 2018]. Retrieved from the internet: <URL: https://pure.mpg.de/rest/items/item_2032498/component/file_2168556/content> 6 pp. 269-274 (Year: 2007).*

* cited by examiner

SQL Data Lineage

Upload the file
Choose File | ...D_v7.11.sql.lineage

Data Lineage | Summary

Show [25 ▼] entries — 612         606         612 — Search: [ ]

| Parent Database 608a | Parent Table 608b | Parent Column 608c | Child Database 608d | Child Table 608e | Child Column 608f ... 608n |
|---|---|---|---|---|---|
| DB1 | Table1 | Column1 | DB1 | Table1 | Column1 |
| DB1 | Table1 | Column1 | DB2 | Table2 | Column2 |
| DB1 | Table2 | Column2 | DB3 | Table3 | Column3 |
| DB2 | Table3 | Column3 | DB2 | Table2 | Column2 |
| DB3 | Table3 | Column3 | DB4 | Table4 | Column4 |
| DB3 | Table5 | Column5 | DB5 | Table5 | Column5 |
| DB5 | ... | ... | ... | ... | ... |

FIG. 6

SYSTEMS AND METHODS FOR CODE PARSING AND LINEAGE DETECTION

CROSS-REFERENCE TO RELATED APPLICATIONS

This application claims priority under 35 U.S.C. § 119 to U.S. Provisional Application No. 62/527,816, filed on Jun. 30, 2017, which is expressly incorporated herein by reference in its entirety.

DESCRIPTION

Technical Field

This disclosure generally relates to big data analytics, and more particularly, to lineage detection and code parsing.

Background

Most financial and information technology companies now rely on various database management systems (DBMS) to store and manipulate "big data," that is, large and complex collections of data, in order to conduct business. For example, companies may create databases in connection with their DBMSs consisting of structured sets of these data collections. The DBMSs may use database applications to operate on the databases to perform many complex calculations for their customers. Programming languages such as SQL are often used by these applications to create, manage, and use the databases. For these companies, accuracy is often an important factor in the operation of a DBMS, because inaccurate calculations performed in the applications may lead to various negative business and legal outcomes. However, accurate, efficient, and fast calculations may lead to positive outcomes.

Thus, many financial companies seek to improve the operation of their DBMSs by identifying and quickly resolving various data defects related to calculations performed by database applications. Often, this involves determining the "data lineage" of calculations of interest. Data lineage includes identifying the hierarchy, discovering the location, and monitoring changes of data elements within a database used in a calculation. However, DBMSs themselves are often unable to provide this data lineage information; thus, accurate and reliable solutions are needed.

To address this issue, third parties have provided diagnostic applications for "parsing," that is, dividing an SQL file into smaller portions by following a set of rules to understand the structure and "grammar" of the SQL code. These software applications, such as ZQL™, JSqlParser™, or General SQL Parser™, work by externally analyzing SQL code in SQL files and providing an output. Once an SQL file is parsed, these applications attempt to identify data lineage information based on the parsed SQL.

However, these third parties' applications are often inadequate for determining data lineage for many SQL files. For example, they cannot determine the data lineage for complex SQL files embodying advanced but common SQL concepts, such as "select all" statements, orphaned columns, column aliases, multiple dependent queries, etc.

In view of these and other shortcomings and problems with database management systems and third party software applications, improved systems and techniques for lineage detection and code parsing are desirable.

SUMMARY

The present invention addresses the disadvantages of the prior art by providing novel lineage detection systems, methods, and techniques for lineage detection of components of a database. Unlike any prior implementations, the disclosed systems and methods improve data quality by allowing for the construction of accurate metadata of Important Data Elements (i.e., data elements that are critical in business analysis and decision-making) in various environments. This is significant because many critical business models have multiple metrics, defined by multiple Important Data Elements (IDEs) residing in different and complex databases. Thus, the disclosed systems and methods may provide clean, accurate, and complete lineage detection of database components to help consumers and programmers understand the definition of calculations, quickly identify the source of data defects, and efficiently resolve other data issues. Moreover, the disclosed systems and methods may improve existing computing systems not only as discussed above, but also by providing the capability to universally process SQL code. For example, this universal processing of SQL code involves parsing multiple disparate implementations of SQL code employed by various DBMS products (e.g., Oracle®, Teradata®, PostgreSQL™, Microsoft® SQL Server®, and MySQL™). To provide these improvements, the disclosed systems and methods may be implemented using a combination of conventional hardware, firmware, and/or software, as well as specialized hardware, firmware, and/or software, such as a machine constructed and/or programmed specifically for performing functions associated with the disclosed method steps. However, in some embodiments, disclosed systems and methods may be implemented instead in dedicated electronic hardware.

According to the disclosed embodiments, a lineage detector or system may comprise a processor and a memory device storing instructions. Lineage detector may acquire a first parameter specifying a body of source code and a second parameter specifying a target calculation. The target calculation may include one or more metrics, processes, IDEs, or the like.

In some embodiments, lineage detector may also parse the source code using various techniques, such as translating "select all" statements, resolving orphaned columns, resolving column aliases, and resolving references between multiple queries, etc. After parsing the source code, lineage detector may determine the data lineage of the specified target calculation based on the parsed source code. According to some embodiments, it may also follow that lineage detector may generate an output of the determined data lineage and display the generated output.

Consistent with the present embodiments, a method for detecting data lineage is also disclosed. The method may include various steps, for example, acquiring a first parameter identifying a body of source code and a second parameter identifying a target calculation in the source code body; parsing the source code; determining data lineage of the target calculation based on the parsed source code; and generating an output of the determined data lineage.

Moreover, according to the disclosed embodiments, a code parser is disclosed. The code parser or system, for example, may have a memory device storing instructions and a processor configured to execute instructions to, for example, acquire a first parameter identifying source code; acquire the source code from the first parameter; parse the source code by modifying at least one of a "select all" statement in the source code, a derived column in the source code, a column alias in the source code, or a first query in the source code that is dependent on a second query in the source code; and generate an output of the parsed source code.

Consistent with the present embodiments, a method for code parsing is also disclosed. The method may include various steps, for example, acquiring a first parameter identifying source code; acquiring the source code from the first parameter; parsing the source code by modifying at least one of a "select all" statement in the source code, a derived column in the source code, a column alias in the source code, or a first query in the source code that is dependent on a second query in the source code; and generating an output of the parsed source code.

Aspects of the disclosed embodiments may also include a tangible, non-transitory, computer-readable medium that stores software instructions that, when executed by one or more processors, are configured for and capable of performing and executing one or more of the methods, operations, and the like consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 6 is an exemplary interface for viewing data lineage, consistent with disclosed embodiments.

DESCRIPTION OF THE EMBODIMENTS

Generally, disclosed embodiments are directed to systems and techniques for providing a computerized lineage detector that allows financial institutions (such as banks) to perform lineage detection. In some embodiments, the term "lineage detection" may be used interchangeably with "determining the data lineage" or "data lineage detection." Either term may be interpreted as the process of identifying the hierarchy, discovering the location, and monitoring the changes of all data elements of a database component (e.g., calculation).

Therefore, it follows that embodiments may be described as detecting the lineage of database components (e.g., calculations, processes, metrics, IDEs, and the like). It should be understood that processes, metrics, and IDEs are related. For illustrative purposes only, consider the situation where a financial institution needs to determine a customer's account balance in an interest-bearing savings account. This process may require one or more metrics, such as the total amount of interest earned and an original balance. A metric may be constructed using various IDEs, such as the principal amount, the interest rate, the time in years for the interest to accumulate, the number of times per year the interest is compounded, etc. And these IDEs may contain other data elements, such as an interest rate that is calculated based on various factors. Thus, it follows that a process may contain one or more metrics, and a metric may contain one or more IDEs.

Further, embodiments are directed to "source code." Source code may include instructions written in various programming languages, such as SQL™, Perl™, JavaScript™, Python™, Ruby™, etc. In reference to SQL, the term "query" may be used. A query is denoted as an instruction written in SQL that allows a user to request desired data and allows a DBMS to plan, optimize, and perform the physical operations necessary to produce the result desired by the user.

Reference will now be made in detail to exemplary embodiments, examples of which are illustrated in the accompanying drawings and disclosed herein. Wherever convenient, the same reference numbers will be used throughout the drawings to refer to the same or like parts. For ease of discussion, the present disclosure may describe embodiments in the context of a financial service provider using a lineage detector to determine the data lineage of one or more financial processes, financial metrics, financial important data elements, or financial data elements. It is to be understood, however, that disclosed embodiments are not limited to this context. Rather, disclosed systems, methods, and techniques to provide lineage detection may be employed to apply to any type of lineage detection, and are not limited to the financial services industry.

Figure 1:
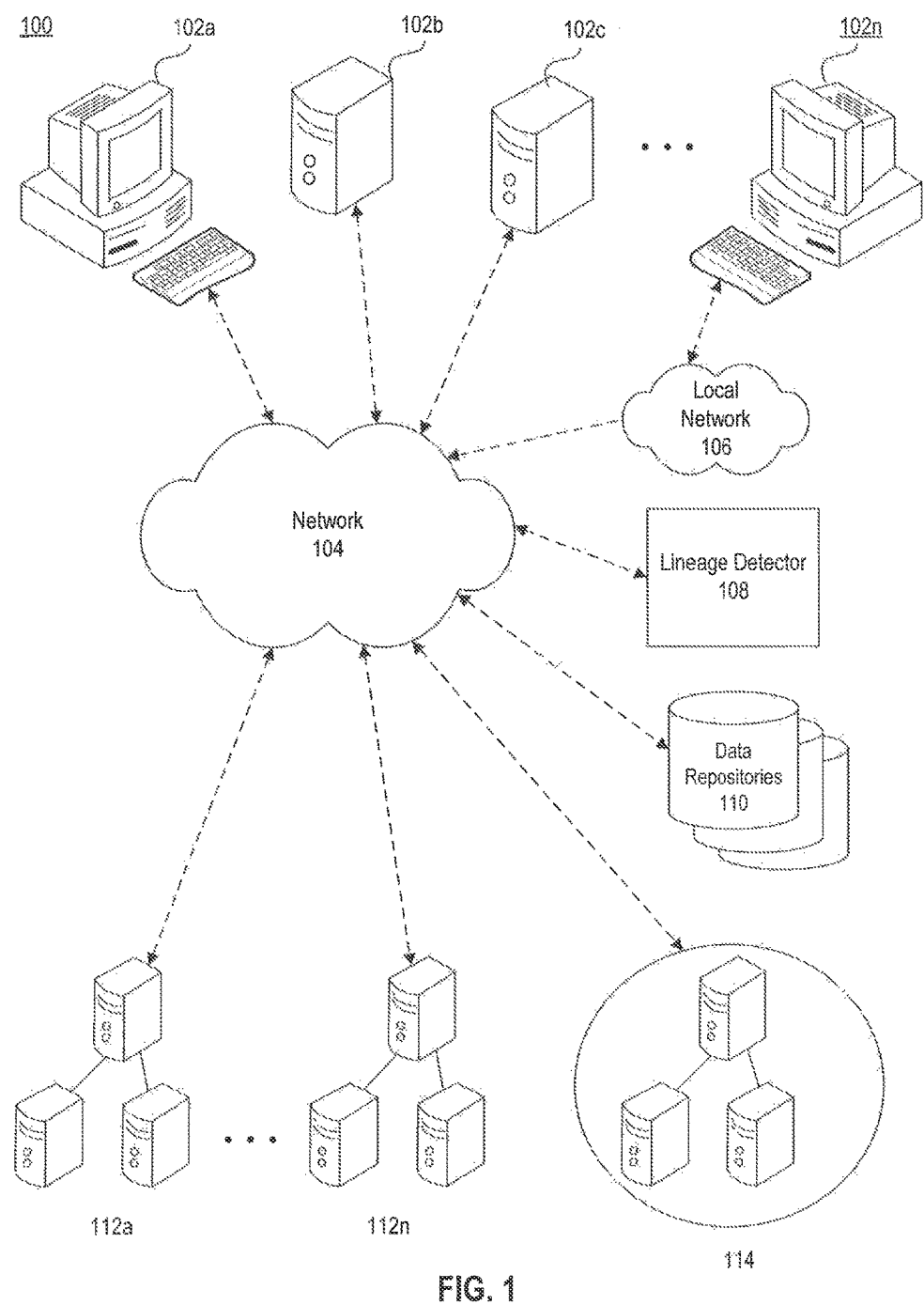
FIG. 1 is a block diagram of an exemplary system environment for lineage detection, consistent with disclosed embodiments.

FIG. 1 is a schematic diagram illustrating an exemplary system environment for lineage detection, consistent with disclosed embodiments. In particular, FIG. 1 shows an exemplary system 100, revealing some technical aspects of the present disclosure for achieving the intended results of the present disclosure. Referring to FIG. 1, system 100 may include one or more of client devices 102a-102n, a network 104, a local network 106, a lineage detector 108, data repositories 110, server clusters 112a-112n, and a cloud service 114. The components and arrangements shown in FIG. 1 are not intended to limit the disclosed embodiments, as the components used to implement the disclosed processes and features may vary.

As shown in FIG. 1, client device(s) 102 may be implemented using a variety of different equipment, such as supercomputers, personal computers, servers, mainframes, mobile devices, smartphones, tablets, etc. In some embodiments, client devices 102 may be configured to receive input from a user, such as a request to determine the data lineage of a calculation in a body of source code. For example, client devices 102 may execute a web browser application to present a web page through which a user may submit a request to parse the source code. Client devices 102 may send the submitted request with parameters included (e.g., identification of the body of source code desired to be analyzed and an identification of a specific calculation that a user wants to target within the body of source code) to lineage detector 108 for processing. Client devices 102 may also be connected to a network, such as network 104. In some embodiments, client devices 102 may be connected to a local network, such as local network 106.

Network 104, in some embodiments, may comprise one or more interconnected wired or wireless data networks that receive data from one service or device (e.g., lineage detector 108) and send it to other services or devices (e.g., client devices 102, data repositories 110, server clusters 112, and/or cloud service 114). For example, network 104 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), and the like. Each component in system 100 may communicate bidirectionally with other system 100 components either through network 104 or through one or more direct communication links (not shown).

Lineage detector 108 may be implemented for use with a variety of equipment, such as supercomputers, personal computers, servers (e.g., server clusters 112 and/or cloud service 114), mainframes, data repositories 110, one or more client devices 102, or the like. In some embodiments, lineage detector 108 may comprise hardware, software, and/or firmware modules. Lineage detector 108 may be configured to acquire parameters inputted by a user or by an external program, and determine data lineage of a calculation specified by the parameters. Lineage detector 108 may then analyze components of the source code, such as translating "select all" statements (e.g., SELECT*FROM DATABASENAME"), resolving orphaned columns, resolving column aliases, and resolving references between multiple queries within the source code. Additionally or alternatively, lineage detector 108 may generate an output of the determined data lineage and display output of the determined data lineage.

Consistent with the disclosed embodiments, data repositories 110 may be configured to store information received, obtained, gathered, collected, generated, or produced by components of system 100. In certain embodiments, for instance, components of system 100 may receive or obtain information for storage over network 104 (and/or local network 106). By way of example, data repositories 110 may store databases related to source code desired to be analyzed. In other aspects, components of system 100 may store information in data repository 110 without using network 104 (e.g., via a direct connection). In some embodiments, components of system 100, including but not limited to lineage detector 108, may use information stored in data repository 110 for processes consistent with the disclosed embodiments.

Server clusters 112 may each be located in the same data center or in different physical locations. Multiple server clusters 112 may be formed as a grid to share resources and workloads. Each server cluster 112 may include a plurality of linked nodes operating collaboratively to run various applications, software modules, analytical models, rule engines, etc. Each node may be implemented using a variety of different equipment, such as a supercomputer, personal computer, a server, a mainframe, a mobile device, or the like. In some embodiments, the number of servers and/or server clusters 112 may be expanded or reduced based on workload.

Cloud service 114 may include a physical and/or virtual storage system associated with cloud storage for storing data and providing access to data via a public network such as the Internet. Cloud service 114 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 104. In some embodiments, cloud service 114 comprises multiple computer systems spanning multiple locations and having multiple databases or multiple geographic locations associated with a single or multiple cloud storage service(s). As used herein, cloud service 114 refers to physical and virtual infrastructure associated with a single cloud storage service, and may manage and/or store data associated with lineage detection.

Figure 2:
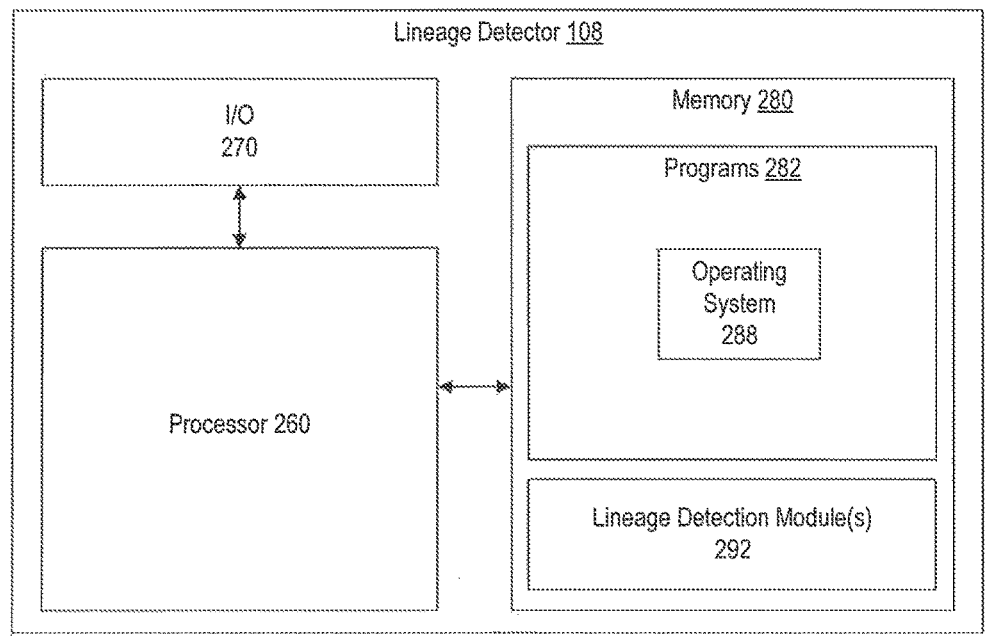
FIG. 2 is a block diagram of an exemplary lineage detector configured to perform functions of the disclosed methods, consistent with disclosed embodiments.

FIG. 2 is a diagram of an exemplary lineage detector configured to perform functions of the disclosed methods, consistent with disclosed embodiments. As shown, lineage detector 108 may include at least one processor 260, at least one input/output ("I/O") device 270, and memory 280 storing data, programs 282 (e.g., operating system 288), and lineage detection module(s) 292. As noted above, lineage detector 108 may be implemented in a single server or in a distributed computer system including multiple servers or computers (e.g., server clusters 112 and/or cloud service 114) that interoperate to perform one or more of the processes and functionalities associated with the disclosed embodiments. In some embodiments, lineage detector 108 is specially configured with hardware and/or software modules for performing functions of disclosed methods. The components of lineage detector 108 may be implemented as specialized circuitry integrated within processor 260 or in communication with processor 260, and/or as specialized software stored in memory 280 executable by processor 260.

Processor 260 may be implemented as one or more known or custom processing devices designed to perform functions of the disclosed methods, such as single- or multiple-core processors capable of executing parallel processes simultaneously to allow lineage detector 108 to execute multiple processes simultaneously. For example, processor 260 may be configured with virtual processing technologies. Processor 260 may implement virtual machine technologies, including a Java virtual machine, or other known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

I/O device 270 may comprise one or more interfaces for receiving input signals from other devices and for providing output signals to other devices to allow data to be received and/or transmitted by lineage detector 108. I/O device 270 may also include interface components that display information and/or provide interfaces to one or more input devices, such as one or more keyboards, mouse devices, and the like, to enable lineage detector 108 to receive input from a user (not shown).

Memory 280 may include instructions to enable processor 260 to execute programs 282, such as operating system 288, server applications, network communication processes, and any other type of application or software known to be available on computer systems. Alternatively or additionally, instructions may be stored in remote storage (not shown) in communication with lineage detector 108, such as one or more database or memory modules accessible over network 104. The internal database and external storage may be implemented in volatile or non-volatile, magnetic, semiconductor, tape, optical, removable, non-removable, or other type of storage device or tangible (i.e., non-transitory) computer-readable medium.

The remote storage may be configured to store information (e.g., structured, semi-structured, and/or unstructured data) and may be accessed and/or managed by lineage detector 108. By way of example, the remote storage may be implemented as databases, such as Microsoft® SQL databases, SharePoint™ databases, Oracle® databases, Sybase™ databases, or other databases. Systems and methods consistent with disclosed embodiments, however, are not limited to separate databases or even to the use of a database.

In one embodiment, lineage detector 108 may include memory 280 that includes instructions that, when executed by processor 260, perform one or more processes consistent with the functionalities disclosed herein. Methods, systems, and articles of manufacture consistent with disclosed embodiments are not limited to separate programs or computers configured to perform dedicated tasks. For example, lineage detector 108 may include memory 280 that may include one or more programs 282 and/or lineage detection module 292 to perform one or more functions of the disclosed embodiments. Moreover, processor 260 may execute one or more programs located remotely from system 100. For example, lineage detector 108 may access one or more remote programs, that, when executed, perform functions related to disclosed embodiments.

Programs 282 may also include one or more machine learning, trending, and/or pattern recognition applications (not shown) that cause processor 260 to execute one or more processes related to lineage detection. For example, the machine learning, trending, and/or pattern recognition may provide, modify, or suggest input variables associated with one or more other programs 282.

Lineage detection module 292 may be stored in memory 280 and executed by processors 260 to implement one or more parts of the lineage detector 108. Specifically, lineage detection module 292 may implement one or more parts of lineage detection process 300, discussed below. In some embodiments, lineage detection module 292 may also utilize third-party software to provide additional functionality to lineage detector 108. For example, lineage detection module 292 may utilize a third-party parser, such as ZQL™, JSqlParser™, or General SQL Parser™, to perform rudimentary parsing of source code. In other embodiments, lineage detection module 292 may provide this functionality without any assistance from third-party software.

Figure 3:
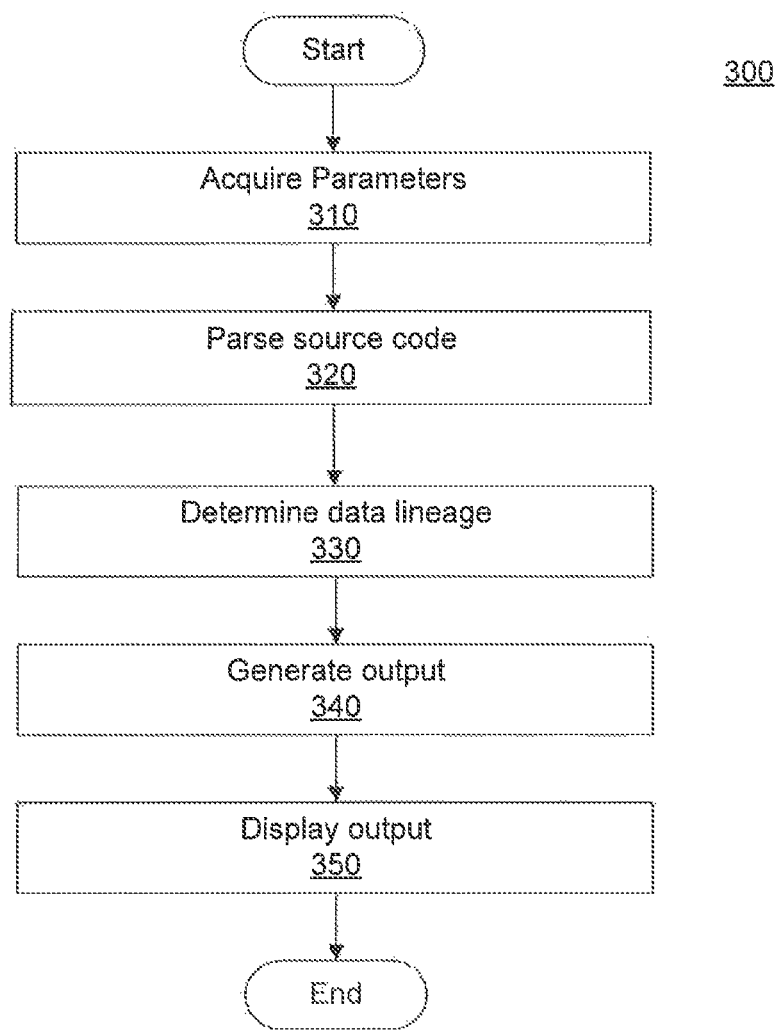
FIG. 3 is a flowchart of an exemplary lineage detection process, consistent with disclosed embodiments.

FIG. 3 is a flowchart of an exemplary lineage detection process 300 that may be performed by lineage detector 108, consistent with disclosed embodiments. In the following description, reference is made to certain components of FIG. 3 for purposes of illustration. It should be appreciated, however, that other implementations are possible and that components other than those illustrated above in FIG. 2 with respect to lineage detector 108 may be utilized to implement the exemplary method of FIG. 3.

At Step 310, lineage detector 108 may initially acquire one or more parameters supplied as input. These input parameters may include one or more calculation parameters specifying the calculations within the source code body desired by a user to be analyzed, the calculation parameters indicating (i.e., pointing to, referencing, or being) one or more calculations. The indicated calculations may also be referred to as target calculations. A calculation may in turn reference a process, metric, IDE, or the like, as defined above.

Lineage detector 108 may also acquire one or more source code parameters that identify or specify the location of the body of source code to be analyzed. Lineage detector 108 may also acquire other parameters that specify a particular part of a calculation (e.g., the numerator in a metric that includes division), a lineage focus time (e.g., the specific time that a process was ran), a particular entity or characteristic associated with a calculation (e.g., a particular user or type of user associated with determining the data lineage for a calculation), a detection level (i.e., a higher or lower hierarchical degree from an initial calculation), etc.

Notably, acquiring the parameters above may occur in several different ways. For example, lineage detector 108 may acquire the parameters by receiving a request from a user. In this aspect, a user using client device 102 may send a request containing parameters to lineage detector 108 in order to determine the lineage of data. The user could send the request containing the parameters manually or programmatically through one or more portals (e.g., websites, command terminals, batch processes, etc.) that are capable of electronically communicating with lineage detector 108. In other embodiments, the request sent by the user may not contain the parameters. Instead, the request sent by the user may contain a network location where lineage detector 108 could retrieve or acquire the necessary parameters.

Lineage detector 108, as another example, may also acquire the parameters by requesting them from an application program interface (API). In the alternative, lineage detector 108 may acquire the parameters by receiving a request from the API. Yet, in other embodiments, lineage detector 108 may acquire a parameter by retrieving it from a location specified by another parameter or stored in memory 280 or on another storage device, such as a storage device located on network 104 or on local network 106. These files may contain actual parameters, network locations pointing to the parameters, or both. These files may also be static or dynamic. Lineage detector may also acquire the parameters from databases, memory, or the like coupled to network 104 and local network 106.

It should be understood that lineage detector 108 may acquire the necessary parameters by utilizing a technique disclosed in one of the examples discussed above or in a combination of the techniques disclosed in the examples above. Regardless of the way the parameters are acquired, lineage detector 108 may acquire updated parameters in real-time or on demand.

At Step 320, after acquiring the parameters, lineage detector 108 may parse source code. As noted above, the source code to be analyzed may include non-programming languages, programming languages, or both. With regards to programming languages, this source code may include various known programming language, such as SQL™, Perl™, JavaScript™, Python™, Ruby™, etc.

Lineage detector 108 may have the capability to ignore or filter out portions of the source code not useful to lineage detection. For example, if a source code contains both Ruby™ and SQL instructions, lineage detector 108 may parse only the SQL instructions while ignoring or filtering out the remaining Ruby™ instructions. Ultimately, lineage detector 108 will parse source code at least in the form of SQL because it is useful to lineage detection. Although other database management languages, such as ScalaQL™, ActiveRecord™, SqlStatement™, Haskell DB™, may also be useful to lineage detection, for simplicity, any reference to source code below will be understood only to include SQL.

To parse source code, lineage detector 108 may analyze each character, word, line, statement, symbol, etc. in the entire remaining body of source code one or more times, and may conduct this analysis recursively. Additionally, lineage detector 108 may also execute one or more parts of the source code in a virtual environment to verify the operability of those parts of the source code. For example, lineage detector 108 may verify that the source code has the correct syntax by running the source code in a virtual environment containing a compiler.

During parsing, lineage detector 108 may edit the source code in memory. For example, lineage detector 108 may create, read, update, or delete any words, lines, statements, symbols, and likewise in the source code at any time.

In some embodiments, lineage detector 108 may make new or modified source code files. These new or modified files may contain any original source code of the acquired source code or only the original source code essential to lineage detection at any time. Regarding each modification of source code, lineage detector 108 may generate or display output, consistent with Steps 340 and 350 below.

Ultimately, at Step 320, to parse code, lineage detector 108 may utilize various specialized techniques to parse source code. It should be appreciated that these specialized techniques overcome the limitations of third-party software applications, as described above, to detect the data lineage of calculations in advanced database systems.

Figure 4:
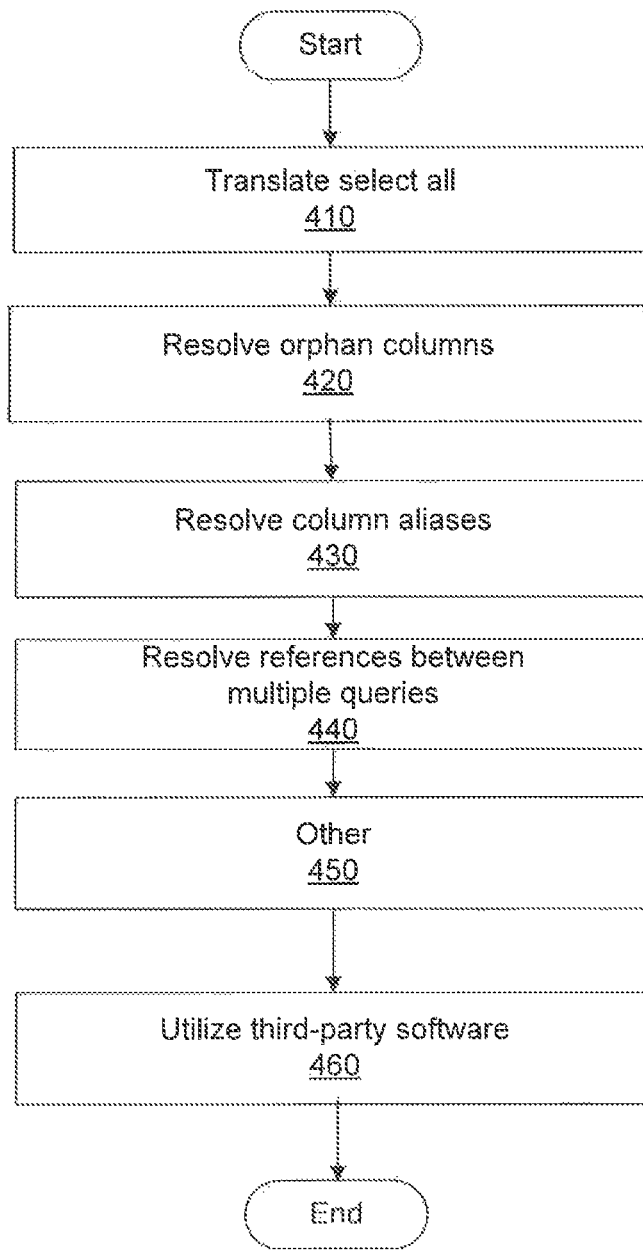
FIG. 4 is a flowchart of an exemplary code parsing process, consistent with disclosed embodiments.

Turning to FIG. 4, a few of these specialized techniques are demonstrated including: translating "select all" statements (at Step 410), resolving orphaned columns (at Step 420), resolving column aliases (at Step 430), resolving references between multiple dependent queries (at Step 440), or performing other techniques (at Step 450). These techniques are described below as illustrative examples, but lineage detector 108 may utilize other equivalent or varied techniques in addition to those described below.

In some embodiments, at Step 410, lineage detector 108 may translate one or more "SELECT*" ("select all") statements in the source code. A "select all" statement translates all of the results in one or more tables of one or more databases. "Select all" statements are commonly used, but third-party software applications do not have the ability to accurately identify all the columns for particular tables in a database from source code. The inability of third-party software applications to translate these statements leads to poor results regarding lineage detection. Lineage detector 108 overcomes this limitation of these third-party applications.

For example, using the statement illustrated below, lineage detector 108 may translate or modify "select all" statements to include all of the columns in a table identified as TABLENAME, which is located in a database identified as DATBASENAME.

SELECT*FROM DATABASENAME.TABLENAME

To accomplish this, lineage detector 108 may acquire or collect all the column names in TABLENAME. To accomplish this, in some embodiments, lineage detector may ask or query the database using SQL to retrieve all column names of TABLENAME. In other embodiments, lineage detector 108 may build a list, array, map, or the like of all the column names of TABLENAME while parsing through the source code. Lineage detector 108, for example, may store a reference to each column (e.g., a column name) of TABLENAME in one or more programming structures (e.g., a list, array, map, variable(s), or the like) in memory 280 until every column name of TABLENAME is included in the programming structure(s). Further, lineage detector 108 may translate or modify the "select all" statements in the source code to identify all of the columns of TABLENAME in DATABASENAME within the programming structure(s). It should be understood that, although the previous example, for simplicity, involves only selecting all the columns of a single table in a database, lineage detector 108, using the same techniques, can select all the columns in multiples tables within one or more databases.

While parsing source code, at Step 420, lineage detector 108 may resolve one or more orphaned columns in the source code. Although orphaned columns appear to be normal database table columns to a casual observer, they are actually derived from other columns and are held in temporary memory rather than stored in the actual database. In view of the example statement below, a programmer may take an actual column named "FEET," referred to as the base column, in a database table named "MEASUREMENTS," and create an orphaned column named "YARDS" by dividing each value in FEET by 3. Using SQL, a programmer may define this relationship between the actual column and the orphaned as:

FEET/3 AS YARDS

However, if a programmer were to search for the YARDS column in the MEASUREMENTS table, the programmer would not be able to find the YARDS column because it would not be stored in the actual database as belonging to the MEASUREMENTS table. It follows that, while orphan columns are dependent on a base column, they are not stored in the actual database. Because orphaned columns appear to be actual columns stored in the database, third-party software applications may fail to detect orphaned columns.

In some embodiments, lineage detector 108 may resolve orphaned columns in the source code by first identifying the corresponding base columns in the source code. For example, lineage detector 108 can identify base columns by performing a search for the SQL keyword "AS" in the source code. Lineage detector 108 may identify characters to the left of the keyword "AS" to include the actual column and characters right of the keyword "AS" to define the orphaned column. Lineage detector 108 may then filter out any operations, such as "/3", on a set of characters or word, such as "FEET," to identify the base column. Lineage detector 108 may also filter out other SQL operations to determine the base column.

In some embodiments, lineage detector 108 may modify any column name derived from each base column in the source code to reflect the derived columns' dependency on the base columns. For example, lineage detector 108 may modify the derived columns in the source code to reflect base column names instead of the derived column names. Lineage detector 108 may recursively process step 420 until it successfully reconstructs the column lineage of all of the derived columns in the source code.

Moreover, in some embodiments, lineage detector 108 may resolve column aliases in the source code (Step 430). Column aliases are a tool utilized by programmers to substitute a more readable column name, that is, an "alias" for the actual name of a column in a database table. Similar to orphaned columns, third-party software applications may fail to distinguish column aliases from actual column names in a database table.

Lineage detector 108 may resolve these column aliases through recursion, by first identifying a column containing an alias and then modifying every reference in the source code that refers to the column alias to reflect the actual column name of the column. For example, lineage detector 108, similar to identifying orphaned columns, can identify the actual name of a column by performing a search for the SQL keyword "AS" in the source code. Lineage detector 108 may identify characters to the left of the keyword "AS" to include the actual name of the column and characters right of the keyword "AS" to define the column's alias. Lineage detector 108 may also filter out other SQL operations to determine the base column, such as any mathematical operations, operations on characters, etc. Lineage detector 108 may recursively process step 430 until it resolves all of the column aliases in the source code.

At Step 440, lineage detector 108 may resolve references between multiple queries or statements in the source code. For example, source code might include a first query that is dependent on a second query. Therefore, it follows that in order to properly parse the first query, the second query would need to be parsed first. Third-party software applications may not have the ability understand, decipher, and parse statements that are dependent upon each other.

On the other hand, lineage detector 108 may resolve references between multiple queries in the source code. In some embodiments, lineage detector 108 may require the use of Steps 410-430 or 450-460, as described above and below, and, in other embodiments, lineage detector 108 may employ other techniques.

Regardless, to resolve references between queries, lineage detector 108 may parse each individual or independent query in the source code and place the elements of the independent query into a temporary programming structure, such as a tree having one or more nodes. Once each query is parsed into a separate tree, lineage detector 108 may reference, or link, corresponding nodes in each tree.

Additionally, in some embodiments, lineage detector 108 may perform other techniques (at Step 450). Lineage detector 108 may make the source code more readable by, for example, applying a predefined format to the source code to make the source code appear "cleaner" to a programmer. As another example, lineage detector may detect syntax errors in the source code that might prevent the source code from executing, and display or send a notification to a user. The notification may also include the line number where the syntax error was found, along with the statement or query containing the error.

Lineage detector 108 may target potentially harmful SQL characters and either delete, highlight, or modify (i.e., "escape") them, and display or send a notification identifying the potential harmful SQL characters. The notification may specify the line number in the source code where the harmful character was found along, with the statement or query containing the harmful character.

In some embodiments, at Step 460, lineage detector 108 may also utilize third-party software, such as ZQL™, JSql-Parse™, or General SQL Parser™, or the like, to perform one or more of these techniques. In these embodiments, lineage detector 108 may perform techniques to prepare the source code before utilizing the third-party software in order to obtain accurate results. For example, lineage detector 108 may convert or process strings, numeric data, or SQL functions in the source code to comply with requirements of the third party software. As part of this conversion process, lineage detector 108 may, for example, take out special characters denoting comments in the source code, replace timestamps in the source code, modify SQL's substring function, and/or the like. Lineage detector 108 may also perform any of steps 410-450 to prepare the source code.

Figure 5:
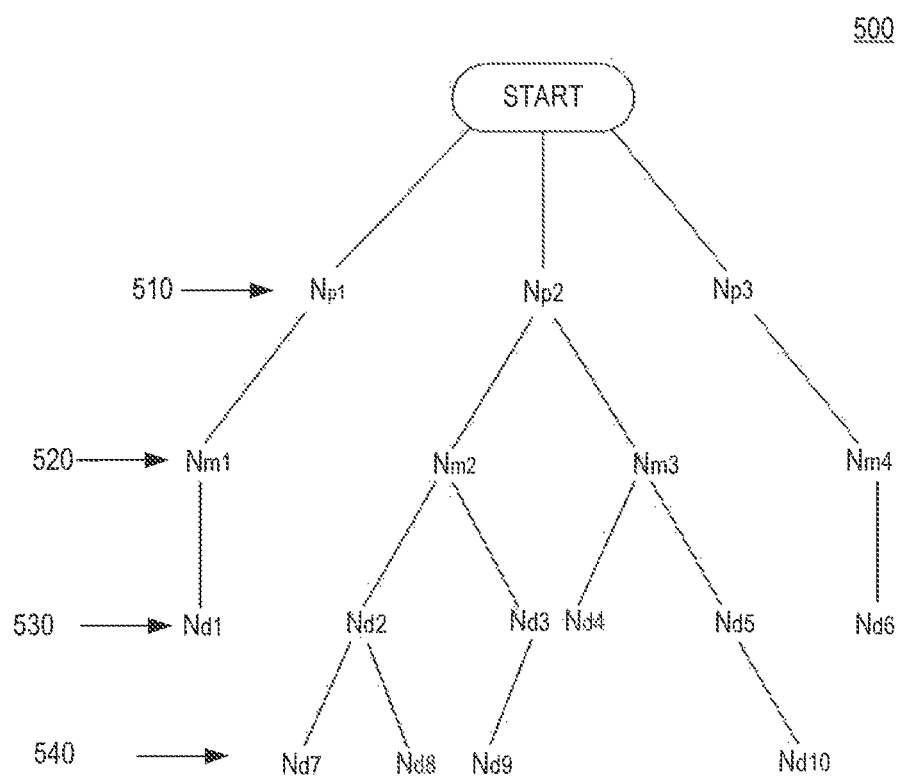
FIG. 5 is an exemplary diagram of converted source code, consistent with disclosed embodiments.

Returning now to FIG. 3, after parsing the source code, at Step 330, lineage detector 108 may determine data lineage of calculations specified by input parameters to data lineage detector 108. Specifically, lineage detector 108 may perform this determination by converting the parsed source code into a temporary programming structure, such as a tree having one or more branches with one or more nodes N. Lineage detector 108 may then determine the data lineage of a specified calculation by "walking down" each branch of the tree that has relevant data elements. As an example, for illustrative purposes only, FIG. 5 is provided as an exemplary diagram of converted source code. It will be assumed that lineage detector 108 has acquired a calculation parameter of parameter "p2" and a source code parameter of source code that, when parsed and converted into a tree structure, may be represented by tree structure 500.

As illustrated, top nodes 510 of the tree consist of multiple processing nodes ($N_{p1}$, $N_{p2}$, and $N_{p3}$). Each top node 510 is connected to (e.g., used by) one or more metric nodes 520 ($N_{m1}$, $N_{m2}$, $N_{m3}$, and $N_{m4}$). Next, each metric node 520 is connected to one or more respective data element or IDE nodes 530 ($N_{d1}$, $N_{d2}$, $N_{d3}$, $N_{d4}$, $N_{d5}$, and $N_{d6}$). Data element nodes 530 are further connected to other data element nodes 540 ($N_{d7}$, $N_{d8}$, $N_{d9}$, and $N_{d10}$), and so on, until bottom nodes, that is, nodes that do not have any other child nodes, are constructed. In this illustration, $N_{d1}$, $N_{d6}$, $N_{d7}$, $N_{d8}$, $N_{d9}$, and $N_{d10}$ constitute bottom nodes 540.

To determine the data lineage of calculation parameter p2, lineage detector 108 attempts to find all nodes that descend from, that is, are child nodes of calculation parameter, "p2." In the example of FIG. 5, lineage detector 108 searches for calculation parameter "p2" among top nodes 510. Accordingly, lineage detector 108 locates node $N_{p2}$ containing calculation parameter "p2."

Following this, lineage detector 108 determines the data lineage of calculation parameter "p2" by acquiring or collecting all of the child nodes of node $N_{p2}$, including the content of the child nodes. In this example, lineage detector may first "walk down" to nodes $N_{m2}$ and $N_{m3}$ of metric nodes 520, which are child nodes of process node $N_{p2}$. Lineage detector 108 then continues determining the data lineage by identifying child nodes of $N_{m2}$ and $N_{m3}$, namely, data nodes $N_{d2}$ and $N_{d3}$; and $N_{d4}$, and $N_{d5}$, respectively. The method continues until all bottom nodes contributing to process node $N_{p2}$ are identified, in this example $N_{d7}$, $N_{d8}$, $N_{d9}$, and $N_{d10}$. All of these nodes, $N_{m2}$ and $N_{m3}$; $N_{d2}$, $N_{d3}$, $N_{d4}$, and $N_{d5}$; and $N_{d7}$, $N_{d8}$, $N_{d9}$, and $N_{d10}$, belong to the data lineage of p2. All of the nodes traversed by lineage detector 108 and their relationship to each other represent the data lineage of the calculation parameter p2.

In some embodiments, the calculation parameter may not correspond to any node among top nodes 510. In such a case, lineage detector 108 may traverse the tree until it finds a node corresponding to the desired calculation parameter. In other embodiments, lineage detector 108 may traverse the tree from the bottom up, starting with nodes 540. It should be understood that FIG. 5 serves as an illustration and other techniques such as breadth first search, depth first search, and/or different programming structures, such as linked-list, maps, etc., could be used to determine data lineage.

Referring back to FIG. 3, at Step 340, lineage detector 108 may generate one or more outputs. For example, lineage detector 108 may generate an output for the determined data lineage as a listing all child nodes of any calculation parameters determined at Step 330. These outputs may be generated by creating and storing a file. In some embodiments, lineage detector 108 may generate an output consisting of a file of Extensible Markup Language (XML) code to represent the data lineage. In other embodiments, lineage detector 108 may generate objects in an object-oriented programming and utilize one or more Extensible Stylesheet Language Transformations (XSLT) to transform the object into an XML file.

Lineage detector 108 could also generate an output using other programming languages or in other ways. For example, lineage detector 108 may generate data lineage output by using a third party application, such as General SQL Parser™. Also, it should also be understood that lineage detector 108 is not limited to generating outputs of only data lineage. Lineage detector 108 may additionally generate one or more output of modified source code files, visual representations of the data lineage, processing logs, error logs, or the like.

At Step 350, lineage detector 108 may display the outputs of step 350. To display an output, in some embodiments, lineage detector 108 may automatically cause one or more of client devices 102 to display an interface for viewing data lineage. In other embodiments, a user may upload one or more files of the output generated in Step 340, as illustrated in FIG. 6. Once uploaded, lineage detector 108 may then cause one or more client devices 102 to display an interface for viewing data lineage.

Lineage detector 108 may utilize various programming languages, such as (Hypertext Markup Language (HTML), Cascading Style Sheets (CSS), JavaScript, jQuery™, etc.), to cause one or more of client devices 102 to display an interface and asynchronously modify the interface in real-time. Lineage detector 108 may also use one or more third-party application, such as Shiny by RStudio, to aid in the displaying of output.

FIG. 6 is an exemplary interface 600 for interacting with data lineage detector 108, consistent with disclosed embodiments. Interface 600 may include input fields 602 (text fields, drop-down menus, checkboxes, image upload areas, etc.) for accepting one or more output files generated at Step 340 of lineage detection process 300.

In some embodiments, lineage detector 108 may access a network location to obtain an output file generated at Step 340 for display on interface 600. Interface 600 may also contain one or more viewing options, such as tabs 604a, 604b, for viewing the output in various ways. For example, tab 604a comprises a data lineage section showing the data lineage output in grid form, and tab 604b comprises a summary section showing a summary in the form of FIG. 5. Viewing options may be selected in ways other than tabs, such as an accordion-type section, etc.

In some embodiments, interface 600's data lineage tab 604a may include grid 606. Grid 606 may display the entire data lineage of the source code parsed in step 320 or may display the data lineage for only certain target calculation parameters acquired in step 310.

Grid 606 has columns 608a-n for each entry of data lineage of a calculation parameter referencing a parent location or the location of a parent data element (e.g., parent database 608a, parent table 608b, parent column 608c) and child location or the location of a child data element (e.g., child database 608d, child table 608e, and child column 608f). Along with these columns, interface 600 may also include, as an illustrative example, rows 610a-n in table 606. Rows 610a-n and columns 608a-n may represent only the data lineage of one or more calculation parameters acquired in step 310 or the entire data lineage of the source code parsed in step 320.

Row 610a, as illustrated, lists the same target location (i.e., parent location) and source location (i.e., child location). As shown, row 610 lists a parent and child both located at database DB1, table Table1, and column Column1. It should be understood that if a row lists the same parent location and child location, then that row represents either a top node 510 or bottom 540 as exemplified by FIG. 5 and described above.

Row 610b, on the other hand, has a parent located at database DB1, table Table1, and column Column1 and a child located at database DB2, table Table2, and column Column2. Also, row 610c has a parent located at database DB1, table Table1, and column Column1 and a child located at database DB3, table Table3, and column Column3. It should be understood that rows 610b and 610c define the child elements of the parent defined by row 610a.

Row 610e, like row 610a, has the same parent and child locations. Therefore, it should be understood that row 610e is a bottom node (e.g., illustrated in FIG. 5 as bottom nodes 520) because it depends from another row or node (610a) but refers to itself (i.e., has the same parent and child locations) in the database. Notice that the parent defined by 610a, however, depends from no other rows or nodes, so as illustrated in FIG. 5, it is a top node because it refers to itself but does not depend on any other rows or nodes.

Using the same techniques as described above in reference to 610a-610d, it is understood that rows 610f and 610e define child nodes that depend from a parent located at database DB3, table Table3, and column Column3. It is also understood that this parent located at database DB3, table Table3, and column Column3 is a child of the parent node defined by row 610a and located at database DB1, table Table1, and column Column1. The rest of table 606 may be understood using these same techniques. However, the relationships described by table 606 are not limited to the ones illustrated nor is the way the relationships are displayed limited to the ones illustrated. Other techniques may be used to visually display data illustrative of data lineage.

Interface 600 may also include one or more table controls 612 that change the number of entries displayed, the type of entries displayed, the type of columns displayed, etc. Interface 600 may be visually depicted in a number of arrangements or the like.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application; such examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A lineage detector, the lineage detector comprising:
a memory device storing instructions; and
a processor configured to execute the instructions to perform a method comprising:
acquiring a first parameter identifying a body of source code and a second parameter identifying a target calculation in the source code body;

parsing the body of the source code to determine elements of a query in the source code, the query including a "select all" statement, the parsing comprising:
- identifying columns associated with a table referenced in the "select all" statement; and
- modifying the "select all" statement to include the identified columns;

determining a data lineage of the target calculation using the elements of the query, the determination comprising:
- generating a tree including hierarchical nodes containing the elements of the query;
- identifying a first top node of the tree representing the target calculation parameter; and
- identifying lower-level nodes having at least one of a direct or an indirect relationship to the first top node; and generating an output of the determined data lineage using the first top node and the lower-level nodes.

2. The lineage detector of claim 1, wherein the target calculation comprises at least one of a process, a metric, or a data element.

3. The lineage detector of claim 1, wherein a top node of the nodes represents the target calculation.

4. The lineage detector of claim 1, wherein a bottom node of the nodes represents a data element of the target calculation.

5. The lineage detector of claim 1, wherein the processor is further configured to execute instructions to acquire a third parameter, a third parameter representing at least of:
- a particular part of the target calculation;
- a lineage focus time;
- a characteristic associated with the target calculation; or
- a detection level.

6. The lineage detector of claim 5, wherein the processor is further configured to execute instructions to determine data lineage of the target calculation based on the third parameter.

7. The lineage detector of claim 1, wherein the processor is further configured to execute instructions to retrieve the source code from a network location, wherein the first parameter identifies the network location.

8. The lineage detector of claim 1, wherein the processor is further configured to execute instructions to display the generated output in an analyzer terminal.

9. The lineage detector of claim 1, wherein the processor is further configured to display the generated output in a self-referential table.

10. The lineage detector of claim 1, wherein the processor is further configured to execute instructions to:
- acquire data from a database; and
- determine the data lineage of the target calculation based on the data from the database.

11. The lineage detector of claim 10, wherein a statement in the source code references an element in the database.

12. The lineage detector of claim 1, wherein the displayed generated output is configured to be used by a software program.

13. The lineage detector of claim 1, wherein the displayed generated output reflects a visual representation of data lineage.

14. The lineage detector of claim 1, wherein the processor is further configured to execute instructions to use a software program to further parse the source code.

15. The lineage detector of claim 14, wherein the processor is further configured to execute instructions to convert at least one of a string, a numeric data, and an SQL function, to conform the source code to requirements of the third-party software.

16. The lineage detector of claim 1, wherein the processor is further configured to execute instructions to modify the source code, wherein modifying the source code comprises modifying a first column reflecting a column alias in the source code with the column name of a second column.

17. The lineage detector of claim 1, wherein the processor is further configured to execute instructions to modify the source code, wherein modifying the source code comprises modifying a derived column in the source code to reflect a dependency on a base column.

18. The lineage detector of claim 1, wherein the processor is further configured to execute instructions to modify the source code to link a first query in the source code to a second query in the source code.

19. The lineage detector of claim 1, the parsing further comprising:
- resolving an orphaned column in the source code by identifying a corresponding base column in the source code.

20. The lineage detector of claim 1, the parsing further comprising:
- detecting syntax errors in the source code that prevent the source code from executing.

* * * * *